US009954884B2

(12) United States Patent
Hassell et al.

(10) Patent No.: US 9,954,884 B2
(45) Date of Patent: Apr. 24, 2018

(54) METHOD AND DEVICE FOR SIMULATING NETWORK RESILIANCE AGAINST ATTACKS

(71) Applicant: Raytheon Company, Waltham, MA (US)

(72) Inventors: Suzanne P. Hassell, Clearwater, FL (US); Paul F. Beraud, III, Parrish, FL (US); Alen Cruz, Tampa, FL (US); Gangadhar Ganga, Clearwater, FL (US); Brian J. Mastropietro, Springfield, VA (US); Travis C. Hester, Alexandria, VA (US); David A. Hyde, Alexandria, VA (US); Justin W. Toennies, Largo, FL (US); Stephen R. Martin, Largo, FL (US); Frank Pietryka, Ridge, MD (US); Niraj K. Srivastava, Shrewsbury, MA (US)

(73) Assignee: Raytheon Company, Waltham, MA (US)

( * ) Notice: Subject to any disclaimer, the term of this patent is extended or adjusted under 35 U.S.C. 154(b) by 26 days.

(21) Appl. No.: 14/437,686

(22) PCT Filed: Oct. 23, 2013

(86) PCT No.: PCT/US2013/066378
§ 371 (c)(1),
(2) Date: Apr. 22, 2015

(87) PCT Pub. No.: WO2014/066500
PCT Pub. Date: May 1, 2014

(65) Prior Publication Data
US 2015/0295948 A1 Oct. 15, 2015

Related U.S. Application Data

(60) Provisional application No. 61/717,360, filed on Oct. 23, 2012.

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC .................. H04L 63/1433; H04L 63/1441
(Continued)

(56) References Cited

U.S. PATENT DOCUMENTS 7,315,801 B1    1/2008  Dowd et al.
8,544,087 B1 *  9/2013  Eskin .................. G06F 21/552
                                                    726/22

(Continued)

FOREIGN PATENT DOCUMENTS

KR        10312375 A    11/1998
KR     1020060027748 A    3/2006
(Continued)

OTHER PUBLICATIONS

Horne, "Data Farming Process and Initial Network Analysis Capabilities",Jan. 27, 2016, MDPI Publishing, pp. 1-18.*
"International Application Serial No. PCT/US2013/066378, International Search Report dated Feb. 6, 2014", 5 pgs.
"International Application Serial No. PCT/US2013/066378, Written Opinion dated Feb. 6, 2014", 8 pgs.
(Continued)

*Primary Examiner* — Kenneth Chang
*Assistant Examiner* — Gregory Lane
(74) *Attorney, Agent, or Firm* — Schwegman Lundberg & Woessner, P.A.

(57) ABSTRACT

Embodiments of a system and method for a cyber modeling and simulation framework are generally described herein. In some embodiments, an interface (212) for ingest of network and vulnerability data associated with a node of a targeted network, a network visualization device (232) for presenting the network data and the vulnerability data, and for creating a network model based on the network and vulnerability data, a threat analysis simulator (240) for launching threat
(Continued)

attacks on the targeted network and for applying modeled defenses against the threat attacks, the threat analysis simulator producing simulation results (244) and a data farming module for performing data fanning on the simulation results using different scenarios to generate a farm of data for use in designing anti-cyber-attack strategies (280) for the targeted network.

18 Claims, 8 Drawing Sheets

(58) Field of Classification Search
USPC .............................. 726/25; 703/13; 709/224
See application file for complete search history.

(56) References Cited

U.S. PATENT DOCUMENTS

| | | | |
|---|---|---|---|
| 2004/0078160 A1* | 4/2004 | Frei ..................... | G06F 17/14 702/79 |
| 2005/0262237 A1* | 11/2005 | Fulton ................ | H04L 43/0882 709/224 |
| 2006/0053490 A1* | 3/2006 | Herz ................... | H04L 63/1433 726/23 |
| 2009/0018996 A1* | 1/2009 | Hunt ..................... | G06Q 30/02 |
| 2009/0320137 A1* | 12/2009 | White ................ | G09B 19/0053 726/25 |
| 2010/0082513 A1* | 4/2010 | Liu ..................... | H04L 63/1458 706/46 |
| 2010/0138919 A1* | 6/2010 | Peng ................. | H04L 29/12009 726/22 |
| 2011/0185432 A1* | 7/2011 | Sandoval ............ | H04L 63/1433 726/25 |

FOREIGN PATENT DOCUMENTS

| | | |
|---|---|---|
| KR | 101681855 B1 | 11/2016 |
| WO | WO-2014066500 A1 | 5/2014 |
| WO | WO-2014066500 A9 | 5/2014 |

OTHER PUBLICATIONS

Barry, P, et al., "Simulation in Context: Using Data Farming for Decision Support", Simulation Conference of the 2004 Winter Washington, (2004), 5-8.

Chi, S-D, et al., "Network Security Modeling and Cyber Attack Simulation Methodology", Lecture Notes in Computer Science/Computational Science (EUROCRYPT)CHES 2002, Springer, vol. 2119, (320-333), Jul. 11, 2001.

Friman, H, et al., "Using Agent Models and Data Farming to Explore Network Centric Operations", Winter Simulation Conference Proceedings of the Dec. 4 Piscataway, DOI: 10.1109/WSC.2005.1574364, ISBN: 978-0-7803-9519-0, (Dec. 4, 2005), 7 pgs.

Suzanne, Hassell, et al., "Evaluating network cyber resiliency methods using cyber threat, Vulnerability and Defense Modeling and Simulation", Military Communications Conference Milcom 2012, XP032315377, DOI: 10.1109/MILCOM.2012.6415565, ISBN: 978-1-4673-1729-0, (Oct. 29, 2012), 1-6.

"International Application Serial No. PCT/US2013/066378, International Preliminary Report on Patentability dated May 7, 2015", 10 pgs.

"Israeli Application Serial No. 238136, Amendment filed Jun. 24, 2015", in English, 22 pgs.

"Korean Application Serial No. 10-2015-7013495, Office Action dated Mar. 2, 2016", w/ English Translation, 14 pgs.

"Korean Application Serial No. 10-2015-7013495, Response filed May 2, 2016 to Office Action dated Mar. 2, 2016", 23 pgs.

"Korean Application Serial No. 10-2015-7013495, Appeal Decision dated Aug. 29, 2016", 19 pgs.

"Korean Application Serial No. 10-2015-7013495, Final Office Action dated Jul. 28, 2016", W/ English Translation, 7 pgs.

"European Application Serial No. 13786119.1, Communication Pursuant to Article 94(3) EPC dated Feb. 6, 2017", 7 pgs.

"European Application Serial No. 13786119.1, Response to Communication Pursuant to Article 94(3) EPC dated Jun. 6, 2017", 15 pgs.

"Israel Application Serial No. 238136, Response filed Aug. 21, 2017 to Office Action dated May 1, 2017", with English translation, 2 pgs.

"Israeli Application Serial No. 238136, Office Action dated May 1, 2017", with English translation, 4 pgs.

* cited by examiner

METHOD AND DEVICE FOR SIMULATING NETWORK RESILIANCE AGAINST ATTACKS

CLAIM OF PRIORITY

This application is U.S. National Stage Filing under 35 U.S.C. 371 from International Patent Application Serial No. PCT/US2013/066378, filed on Oct. 23, 2013, and published on May 1, 2014 as WO 2014/066500 A1, which claims the benefit of priority to U.S. Provisional Patent Application Ser. No. 61/717,360, filed on Oct. 23, 2012, which is incorporated herein by reference in its entirety.

BACKGROUND

Cyber security is a global issue of growing importance. Cyber espionage can affect technical, military, political and economic interests anywhere. Attacks are no longer direct; they are increasingly sophisticated and stealthy. Cyber resiliency of systems and networks ensures mission survivability in a cyber compromised environment. Resilient computer network defense anticipate the emergence of new vulnerabilities, take action to avoid threat actors seeking to exploit these vulnerabilities, and disrupt the actions of successful intruders to increase their work factor and minimize their impact. The focus of resiliency is the assumption that the attackers are inside the network, they cannot be detected, and yet mission survivability is the objective. The task of the cyber analyst is to effectively manage the security risk of his or her mission operating environment, and in the course of daily duties, mitigate cyber threats and vulnerabilities.

Network mapping and vulnerability identification tools such as Nessus®, Nmap® and other cyber security tools have existed for a long time and are useful for identifying vulnerabilities in commercial off-the-shelf (COTS) components typically found in enterprise IT networks. Tools which monitor and check routing and firewall policies and show vulnerability paths, such as Skybox®, NetSpa and Cauldron cyber security tools help to identify potential attack paths to assist in prioritization of remediation using patching or configuration policy changes. However, these static capabilities do not provide the dynamic nature of resiliency techniques or for "what-if" scenarios and 0-day vulnerability risk management assessments.

Cyber-attack dynamic simulations consider target modeled networks, cyber-attack threads and applied defenses to generate cyber-attack success/failure metrics, such as percent attack success and time attack spends in each attack phase. However, resultant target network function and performance degradation and collateral damage post cyber-attack aren't well analyzed or depicted. Moreover, these tools do not have timing as a component thereby making them unsuitable to model dynamic defenses.

DETAILED DESCRIPTION

Figure 1:
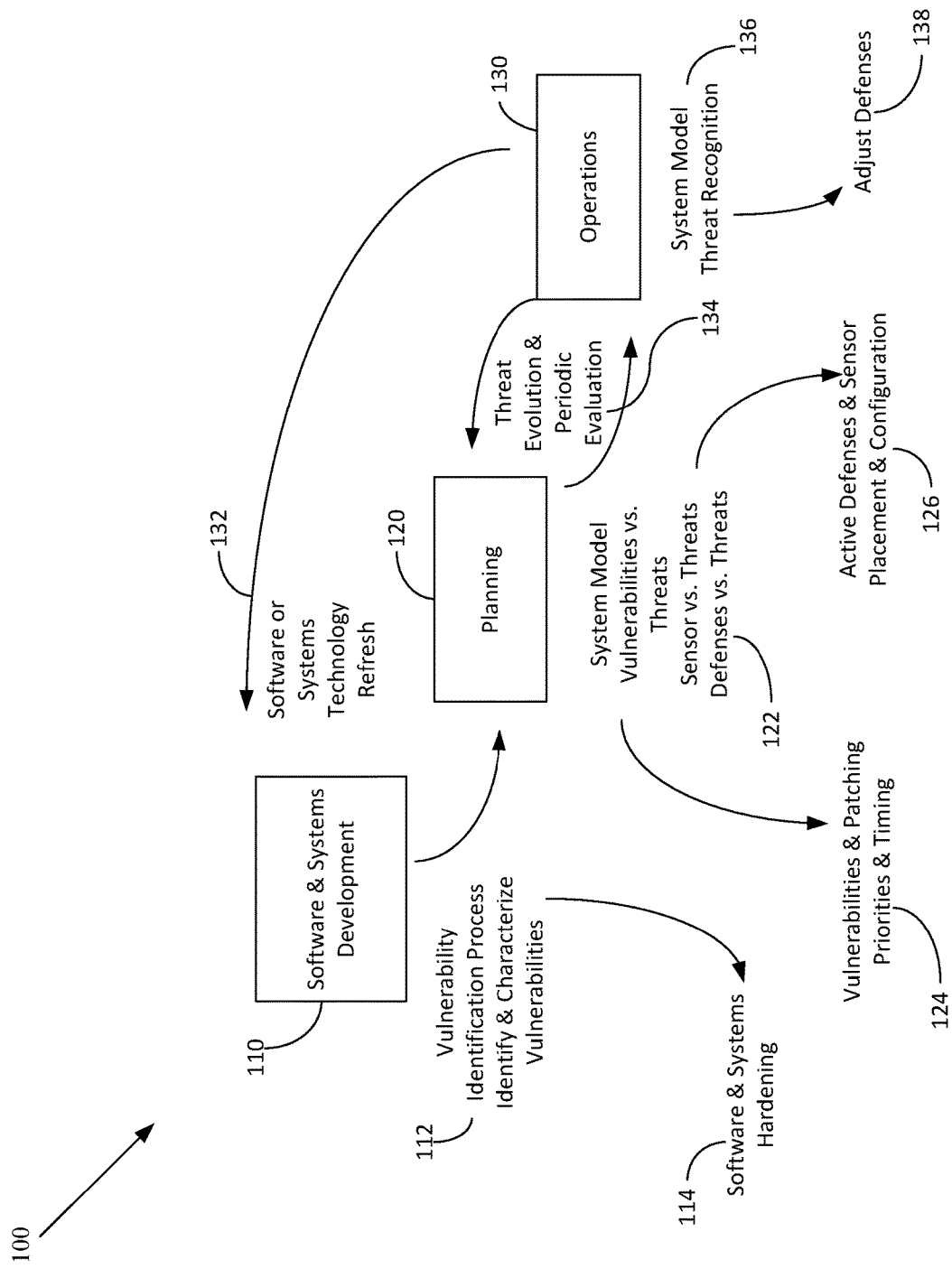
FIG. 1 illustrates software and systems development, planning, and operations phases for mission assurance phases of a system according to an embodiment.

Embodiments described herein provide a cyber analysis modeling evaluation for operations (CAMEO) simulation system that models cyber threats and agile defense techniques in order to enable the cyber analyst to evaluate the cyber resiliency of systems and networks. Military infrastructure and other networks to be modeled are typically a combination of COTS, government off-the-shelf (GOTS) and custom components, and can have both Internet Protocol (IP) and non-IP network segments and links. To keep up with the evolving threats and agile defenses, extensible threat and defense libraries are provided. A cyber threat, vulnerability and defense modeling and simulation tool kit is used for evaluation of systems and networks to improve cyber resiliency. This capability is used to help increase the resiliency of networks at various stages of their lifecycle, from initial design and architecture through the operation of deployed systems and networks. Resiliency of computer systems and networks to cyber threats is facilitated by the modeling of agile and resilient defenses versus threats and running multiple simulations evaluated against resiliency metrics. This helps network designers, cyber analysts and security operations center personnel to perform trades using what-if scenarios to select resiliency capabilities and optimally design and configure cyber resiliency capabilities for their systems and networks.

The cyber analysis modeling evaluation for operations (CAMEO) simulation system according to an embodiment provides a cyber defense simulation toolkit to evaluate risk and enhance the resiliency of networks in the face of cyber-attacks. Its goal is to provide a scalable, modular, distributed architecture and framework for cyber resiliency visualization and simulation to support the evaluation and selection of agile and resilient techniques during planning and operations of tactical mobile networks and other mission networks.

The system models and simulates the interactions between threats, defensive strategies, networks, mission functions, and vulnerabilities. This simulation space is itself a complex system, a system of many parts which are coupled in a nonlinear fashion. Because they are nonlinear, complex systems are more than the sum of their parts and are likely to exhibit non-linear effects such as emergent behavior based upon the interaction and relationships of the parts and extreme sensitivity to initial conditions. We use CAMEO to verify and validate possible configurations and behavior for cyber agile and resilient defenses, to study sensitivity to initial configurations and discover unanticipated emergent behavior.

In order to support exploration of the large high-dimensional scenario space, and "what-if" evaluation of resiliency techniques, themselves dynamic, against evolving cyber threats, data farming is leveraged. Data farming techniques allow systems with nonlinear interactions to be modeled and computed to study complex dynamics and unpredictability. Metrics for evaluation of generic resiliency aspects may be pulled from across various industries, including safety, telecommunications, infrastructure protection etc.

A scalable, modular, distributed architecture and framework according to an embodiment is provided for cyber agile defense visualization and simulation to support the selection and configuration of the most effective active defenses and attack detection mechanisms during planning and operations of tactical mobile networks and other mission networks. A cyber analyst may therefore perform active cyber defense planning, modeling of vulnerability assessment and remediation inputs, operational course of action (COA) recommendations for active cyber remediation planning and gather and analyze cyber resilient defense metrics to select resilient techniques FIG. 1 illustrates software and systems development, planning, and operations phases for mission assurance phases of a system 100 according to an embodiment. In FIG. 1, software and systems development 110 leads to planning 120. The planning 120 supports operations 130. The operations 130 provide software and/or systems technology refresh 132. A vulnerability identification process 112 is used to identify and characterize vulnerabilities. A model 122 according to an embodiment allows comparison of vulnerabilities to threats, sensors to threats, defenses to threats, etc. Threat evolution and periodic evaluation 134 take place between the planning phase 120 and the operations phase 130. A model 136 according to an embodiment provides threat recognition at the operations phase. The threat recognition provided by model 136 allows adjustment of defenses 138.

The vulnerability identification process 112 leads to software and systems hardening 114. The system model 122 that allows comparison of vulnerabilities to threats, sensors to threats, defenses to threats, etc., supports vulnerabilities and patching prioritization and timing 124 and active defenses and sensors placement and configuration 126. The planning phase 120 may be used to support the Design System Security Architecture and Develop Detailed Security Design phases of NIST SP 800-37 and the Concept and Development phases of the Committee on National Security Systems Instruction (CNSSI) No. 1253.

Figure 2:
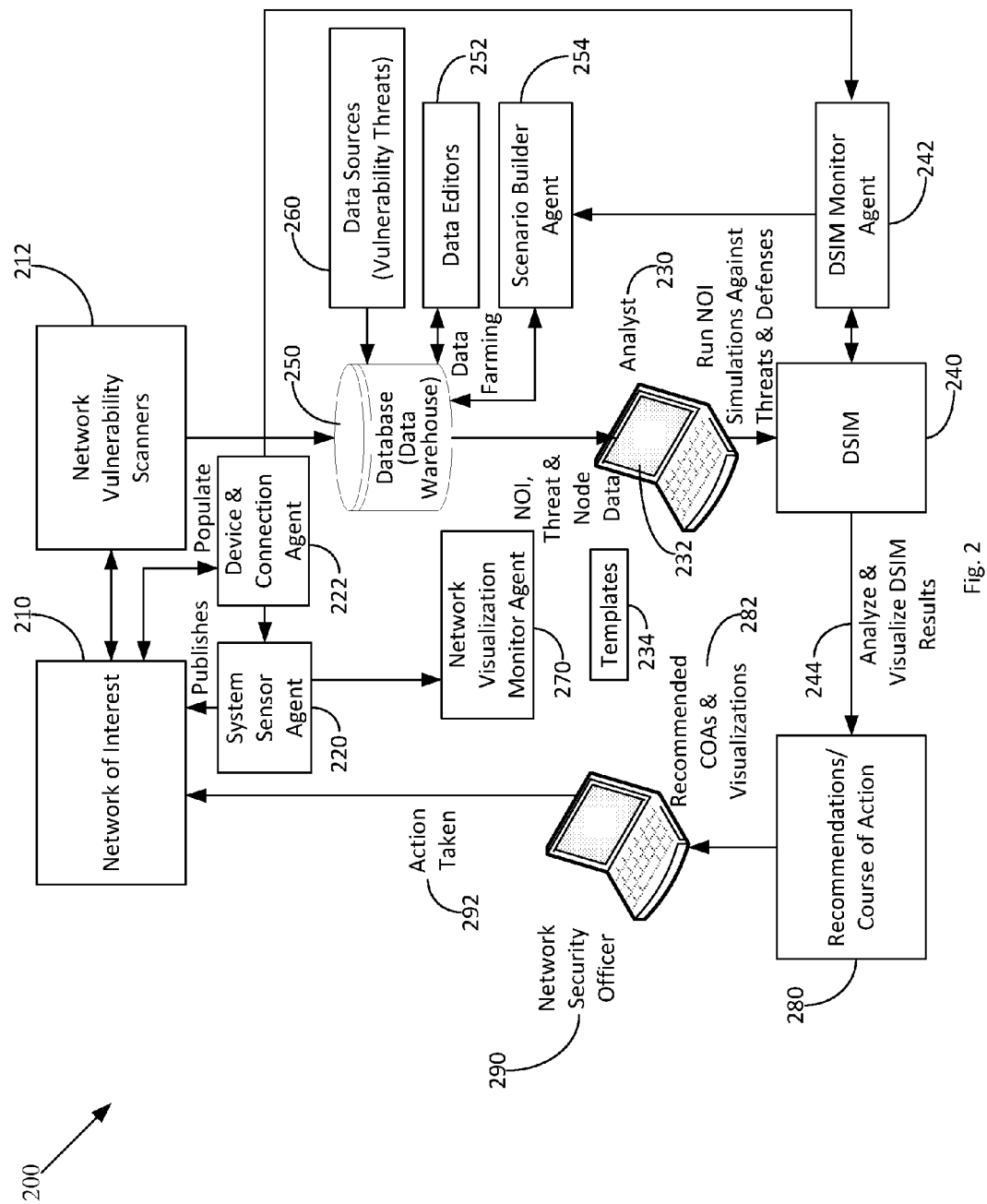
FIG. 2 illustrates a system for the modeling and simulation analysis process according to an embodiment.

FIG. 2 illustrates a system 200 for the modeling and simulation analysis process according to an embodiment. Node data of a targeted network of interest 210 may first be scanned using a vulnerability scanning tool 212, such as Nessus®. The system 200 may not be connected to the network 210 under study physically, but ingests data produced by tools 212 that may be connected to the network in order to provide a simulated target network topology. An agent framework handles information changes. After a cyber analyst 230 ascertains the network data model, the system 200 initiates a discrete simulation (DSIM) 240 and launches simulated threat attacks that seek to reach the final attack phase, i.e., exploitation on a target node in the modeled network. Defenses are modeled that can be applied independently or in combination, while attacks are taking place on the simulated target network 210.

In FIG. 2, a system sensor agent 220 initially publishes a network 210, wherein devices and connection agents 222 are populated. A network vulnerability scanner 212 may scan a network of interest (NOI) 210 and provide the results to a database 250 in the system 200. One aspect of the system 200 involves the importing of data into the system 200 and creating visualization of the imported data. An ingest service, such as network vulnerability scanners 212, provides a single common interface for disparate authoritative sources of device, application, hardware, vulnerability, and weakness data, and automates the enrichment and correlation of the data. Through ingestion of network configurations, vulnerabilities and platforms, the system 200 makes modeling more automatic. The data ingest may be triggered manually from a graphical user interface 232 accessed by an analyst 230. Network topologies may be input into the database 250 via import from vulnerability scanning tools, such as Nessus® or Nmap®. Additional components, connections etc. are added or changed via the GUI or a network visualization (NVIS) tool to match the actual network topology. This may also be used to support "what-if" architecture changes for resiliency evaluation and trade-offs.

Data sources 260, such as proprietary data sources and administered data sources (e.g., MTRE), provide vulnerability threats to the database 250 (e.g., data warehouse). The system 200 may use data sources including common platform enumeration (CPE) dictionary for hardware, application, operating systems, national vulnerability database, common vulnerability enumeration (NVD-CVE) for vulnerabilities with associated metrics and affected CPEs, common weakness enumeration (CWE) for weaknesses with potential mitigation approaches, common attack pattern enumeration and classification (CAPEC), which is a catalog of attack patterns and associated CPE, NVD configurations and others. The database 250 stores resultant data from scenario runs to facilitate ease of analysis. The data warehouse implements a database structure to manage the various technical specifications of technologies being modeled. This allows for the creation of simple tools that enable users to perform many "what if" analyses without having any knowledge of the simulation environment, the data farming, or knowledge harvesting tools. The database 250 also facilitates integration with collaboration tools through standards based interfaces. The database 250 may be manipulated using data editors 252.

The scanned results of the NOI and the threat data 254 may be provided to the analyst 230. The analyst 230 may build and edit scenarios. Once the network and vulnerabilities have been ingested, the network visualization monitor agent 270 enables the analyst/user to manipulate and visualize the various aspects of the target network 210 being simulated and to conduct operations on its component tree and their interconnections. The network visualization monitor agent 270 monitors the devices and connections 222 from the system sensor agent 220 and visualizes them in simulated real time. New vulnerabilities may be defined and new platforms and components added to the modeled network to provide "what-if" simulations. The use of plug-in and extensible threat and defense templates 234 allows the model to be maintained for evolving threats. There are several views (depicted) and layouts that can be selected for various analytic and display functions. The system 200 also allows creation of custom vulnerabilities and platform identifiers in the model GUI to support custom components or embedded systems in addition to COTS, and the creation of custom vulnerabilities for "what-if" capabilities for potential zero day vulnerability risk assessment. For closed networks, or networks which have custom components or whose policies forbid use of network scanning equipment, the network topology may be entered by the analyst 230 into the system via GUI menus 232 or NVIS tools 270.

The device and connection agent 222 are used by a DSIM monitor agent 242 to run simulations of NOI 210 against various threats with defenses which in turn publishes simulation effects on devices. Simulations may be run against threats and defenses. As mentioned earlier a discrete simulation (DSIM) 240 may be executed to produce analyzed and visualized DSIM results 244. The DSIM 240 may include network, attack and defense simulations. The DSIM monitor agent 242 is used by a scenario builder agent 254 to combine network and threats and submit the scenario to run data fanning to produce DSIM results 244. From the DSIM results 244, at least one recommended course of action 280 may be identified by the system 200. A network security officer 290 may then receive the recommended course of action 282 and take action 292.

The use of an agent architecture for the simulated network 210 provides play-back of selected cyber-attacks on a network and the defenses in simulated real-time to increase understanding of the cyber analyst 230. The system 200 is arranged to provide a scalable, modular, distributed architecture and framework for cyber agile defense visualization and simulation to support the selection and configuration of the most effective active defenses and attack detection. The architecture development for the system 200 includes several guiding quality attributes, such as extensibility and scalability, which may be supported by architecture components as described herein below.

The system 200 provides dynamic modeling and simulation for determining cyber threat risk to specific networks and systems, and evaluation of resilient defenses for "what-if" scenarios and 0-day vulnerabilities. The system 200 supports IP and non-IP networks. An extensible library of threats and defenses templates 234 may be developed and used in the modeling and simulation of cyber threats. The system 200 provides a temporal component for evaluation of dynamic, agile defenses. Visualization tools are provided by the network visualization monitor agent 270 to provide illustrations of the threat scenarios.

During planning and network design, the system 200 according to an embodiment may be used to evaluate different candidate architectures. Initially, the analyst 230 may select and evaluate the defense configuration and tools in the context of the network design and potential threats. During the architecture phase, the analyst 230 may evaluate resiliency methods, services, tools, and algorithms to fit the planned network. The system 200 supports the architecture tradeoffs by repeated execution of the model using different configurations and even placements of the defenses based upon identification of the variable defenses by the analyst 230 through a graphical user interface (GUI) 232. Several varieties of each type of defense may be selected to trade-off with costs assigned to each one. This supports cost tradeoffs for vendor equipment and resiliency techniques to be made to provide a more cost effective security architecture.

Cyber resiliency techniques selected originally for the network 210 may typically be adapted and updated during operations to handle evolving threats as well as planned network changes. Changing missions or goals may change the criticality of systems or networks involved in the mission, creating the need to reconfigure existing cyber resiliency defenses or deploy different resiliency techniques. Some examples include the cyber maneuver interval, reconstitution interval or operating system diversity ratios.

Figure 3:
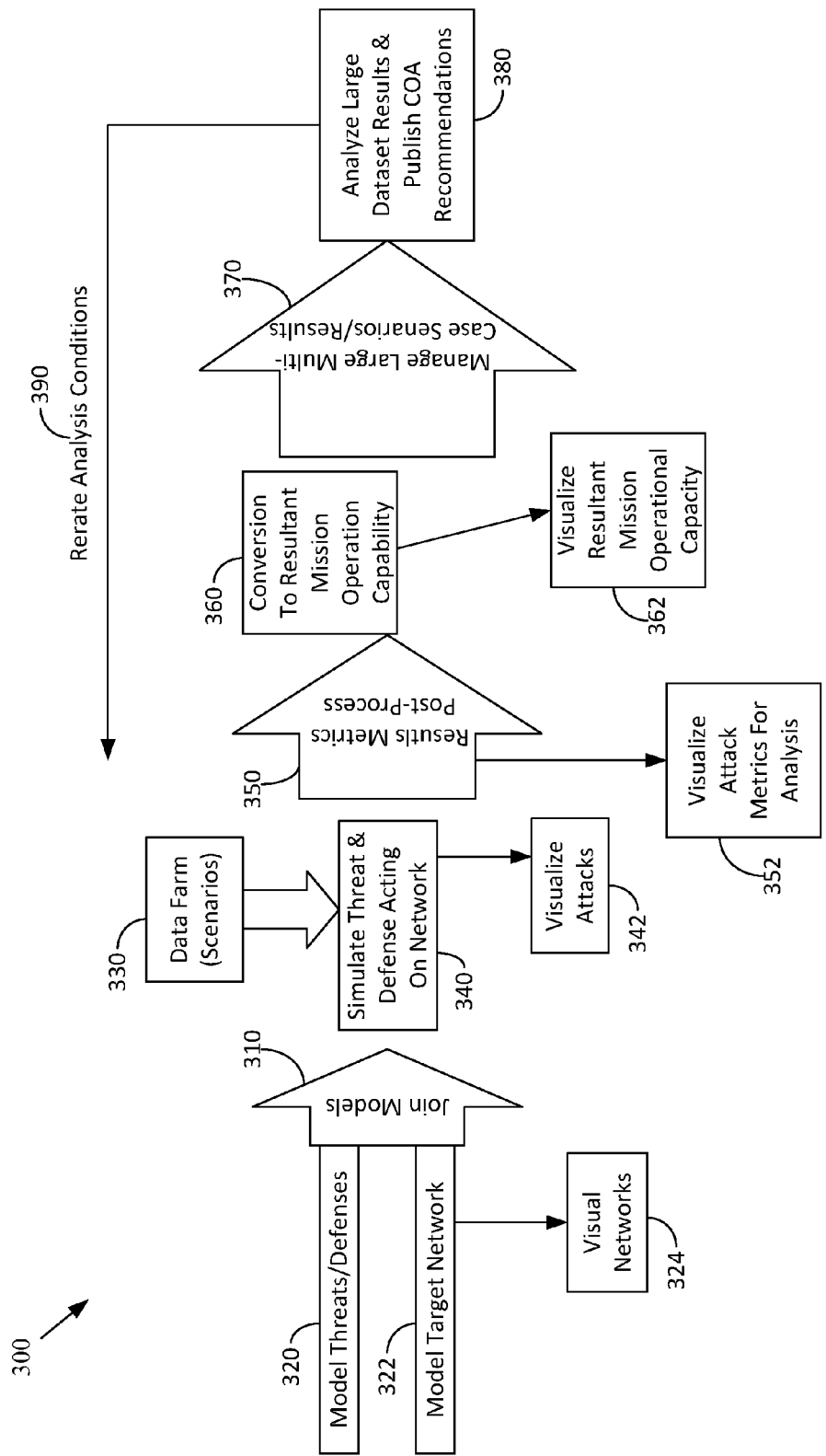
FIG. 3 illustrates a map of the data flow for the cyber analysis modeling evaluation for operations simulation system according to an embodiment.

FIG. 3 illustrates a map of the data flow 300 for the cyber analysis modeling evaluation for operations simulation system according to an embodiment. At various stages in the workflow, data is post-processed to narrow the output of the data farming into a grouping of the data of interest. This post-processing is primarily based upon resiliency metrics and their values. From these selections, results can be visualized using the DSIM Monitor, saved for further reference, and used to create course of action (COA) recommendations.

More specifically, in FIG. 3 the system joins 310 model threats/defenses 320 and model target networks 322. The model target network data may be used to provide a visualization of the networks 324. Scenarios 330 are maintained in a data farm and provided to a simulator 340 for simulation of the threat and defense acting on the network. A visualization tool may be used to visualize the attacks 342. Results metrics from the simulation 350 are provided for post-processing. The attack metrics may also be visualized for analysis 352. The results metrics 350 are converted to resultant mission operations capability 360. The resultant mission operational capability 360 may then be presented visually 362.

Metrics 350 may be used to evaluate resiliency techniques and cyber threats. Through the definition of these metrics 350, time becomes the fundamental measure of success and effectiveness. As examples, metrics 350 are described below, wherein these metrics 350 are a subset of those used to evaluate such techniques as cyber maneuver, deception and reconstitution, and to provide the optimal dynamic configuration of these techniques in an evolving threat environment.

Percentage of successful attacks—A successful attack is defined as one which accomplishes its goal—exploit phase.

Percentage of partially successful attacks—An attack is partially successful when it executes its phases up to, but not including, the exploit phase.

Mean number of attack disruptions—Disruptions are any effect a cyber defense produces that impedes the progress of an attack through its process.

Time spent per attack phase—An attack's timing profile can be characterized by the amount of time it spends in each of its phases. As an example, cyber maneuver techniques seek to increase the time spent in the network and host reconnaissance phases.

Duration of successful attack—Duration of a successful attack is the time consumed to execute from the first phase to the last (e.g., Foot-printing through Exploitation). This execution time may include multiple revisits to intermediate phases, either due to the way the attack behaves, or obstruction due to cyber defenses. Given multiple observations, the mean time can be computed.

Defensive efficiency—Defensive efficiency is the measure of how often an attack is disrupted versus how often defensive action is taken. For example, this measure can be used to tune the average cyber maneuver intervals.

Defense Work Factor—The defense work factor definition can vary per resiliency technique. For example for randomized active defenses such as cyber maneuver or reconstitution, it captures the ratio of the preemptive defense interval to the nominal duration of a particular type of attack. It provides a measure of the relative speed of execution between defense and attack.

Attack noise—In order for an attack to progress through a system, it executes certain operations. These operations or activities can be thought of as noise in the system, which could potentially be detected by a cyber network or system sensor.

From the result metrics, large multi-case scenario results 370 may be managed. The large dataset results 370 may be analyzed to publish a course of action recommendations 380. The process may be reiterated 390 to further refine the analysis conditions.

Figure 4:
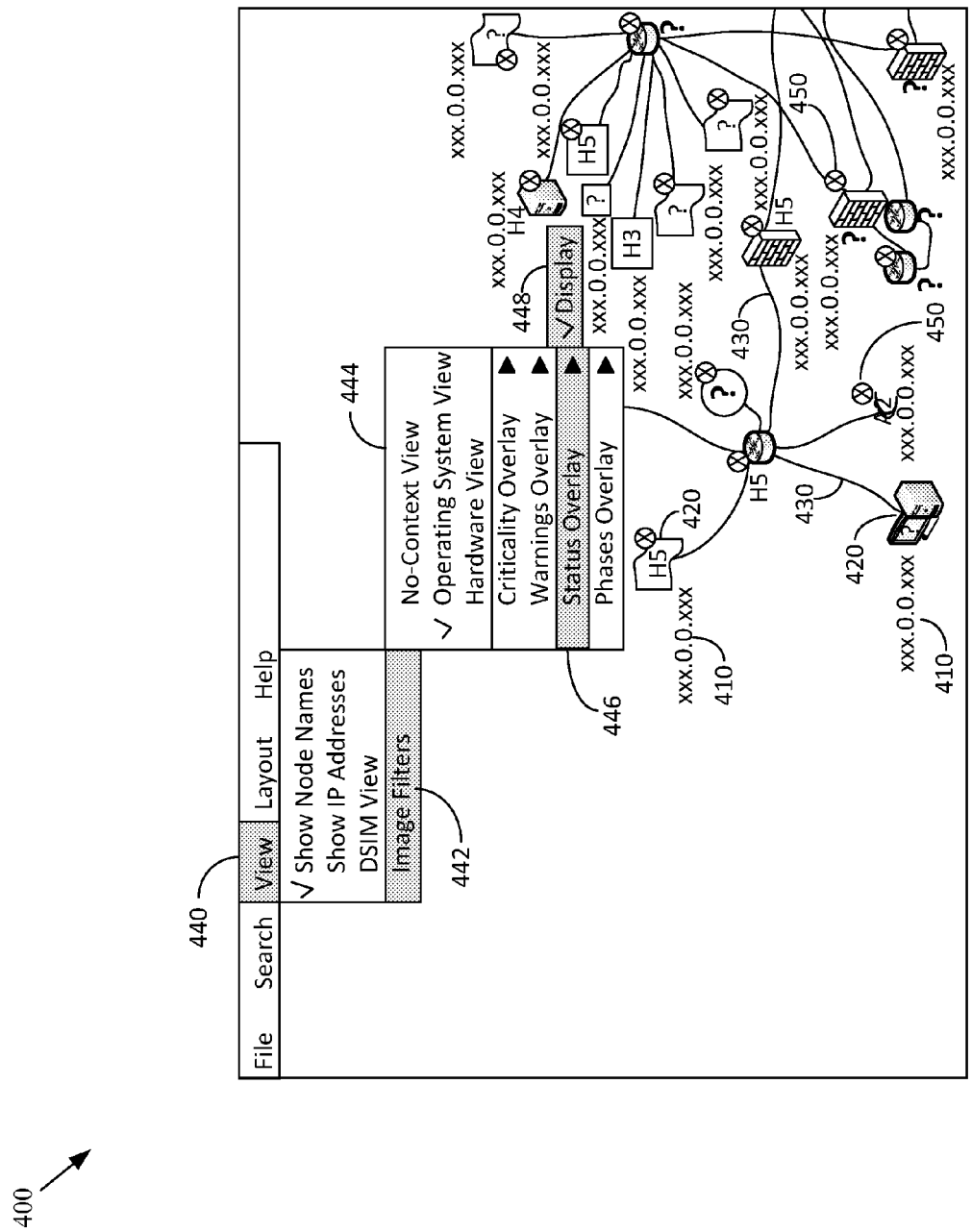
FIG. 4 illustrates a network node graphical editor screen according to an embodiment.

FIG. 4 illustrates a network node graphical editor screen 400 according to an embodiment. Once the network and vulnerabilities have been ingested, the network visualization component of the system toolset enables the analyst/user to manipulate and visualize the various aspects of the target network being simulated and to conduct operations on its component tree and their interconnections. FIG. 4 shows IP addresses 410, operating system and hardware icons 420, and interconnections 430 between them. There are several views 440 (depicted) and layouts that can be selected for various analytic and display functions. Image filters 442 may be selected. From the resulting menu 444, a status overlay 446 may be selected for display 448. FIG. 4 illustrates the vulnerability view wherein an "x" 450 indicates a vulnerability.

Figure 5:
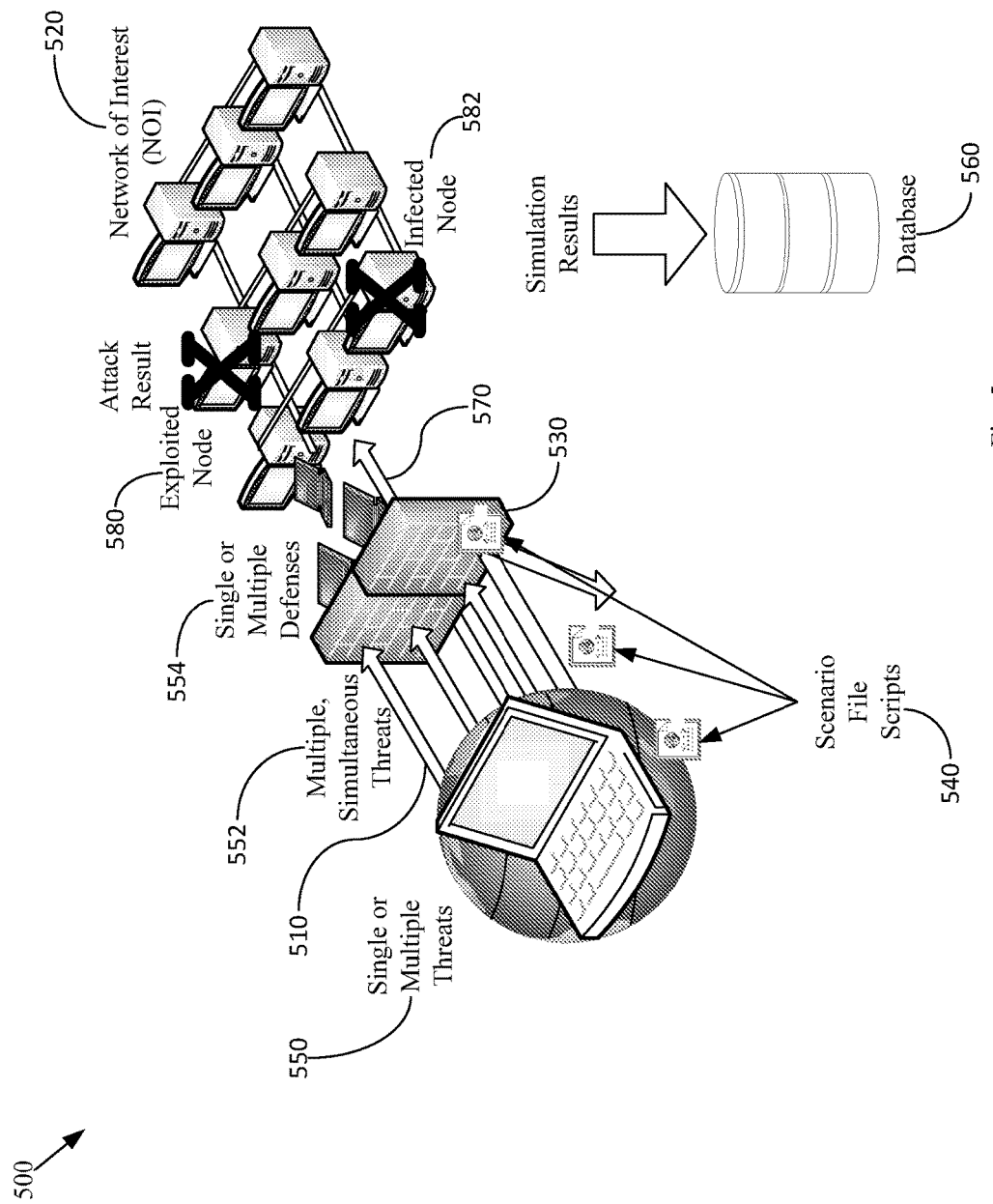
FIG. 5 illustrates a discrete simulation (DSIM) module for producing analyzed and visualized DSIM results according to an embodiment.

FIG. 5 represents a discrete simulation (DSIM) 500 for producing analyzed and visualized DSIM results according to an embodiment. The DSIM 500 pits threats 510 against the target network 520 and any applied defenses 530. Scenario file scripts 540 may be used to assign simulation component files for different scenarios, including threats, defenses and type of attacks. There may be single or multiple threats 550, multiple, simultaneous attacks 552, single or multiple defenses 554. The scenarios may be applied to the network 520. The attack results are noted and the simulation results are provided to database 560.

The threats in the threat library used as templates 540 may be Java models, with embedded behavior. These threat models templates 540 are extremely flexible. Typically, one of the existing threat model templates 540 may be configured through the GUI, and the threat model behavior may be set by network topography, e.g., connectivity, or timing without having to develop a new java model. In circumstances where the threat library cannot be included, or in cases where new threat behavior or specialized or proprietary threats are used, new java threats may be created. Similarly to developing a threat model, a new defense or resilience technique model can be developed using the defense models as templates. Simulations and evaluations of new resiliency techniques may be simulated prior to investing in full-scale development of a resiliency technique as part of a system or product.

As shown in FIG. 5, the simulation shows threats 510 against the NOI 520. The defenses 530 repel some of the attacks. However, one attack 570 passes through the defenses 530 and is able to attack the NOI 520. As shown in FIG. 5, one network node is exploited 580 and one network node is infected 582. The simulation results are then provided to a database 560.

Figure 6:
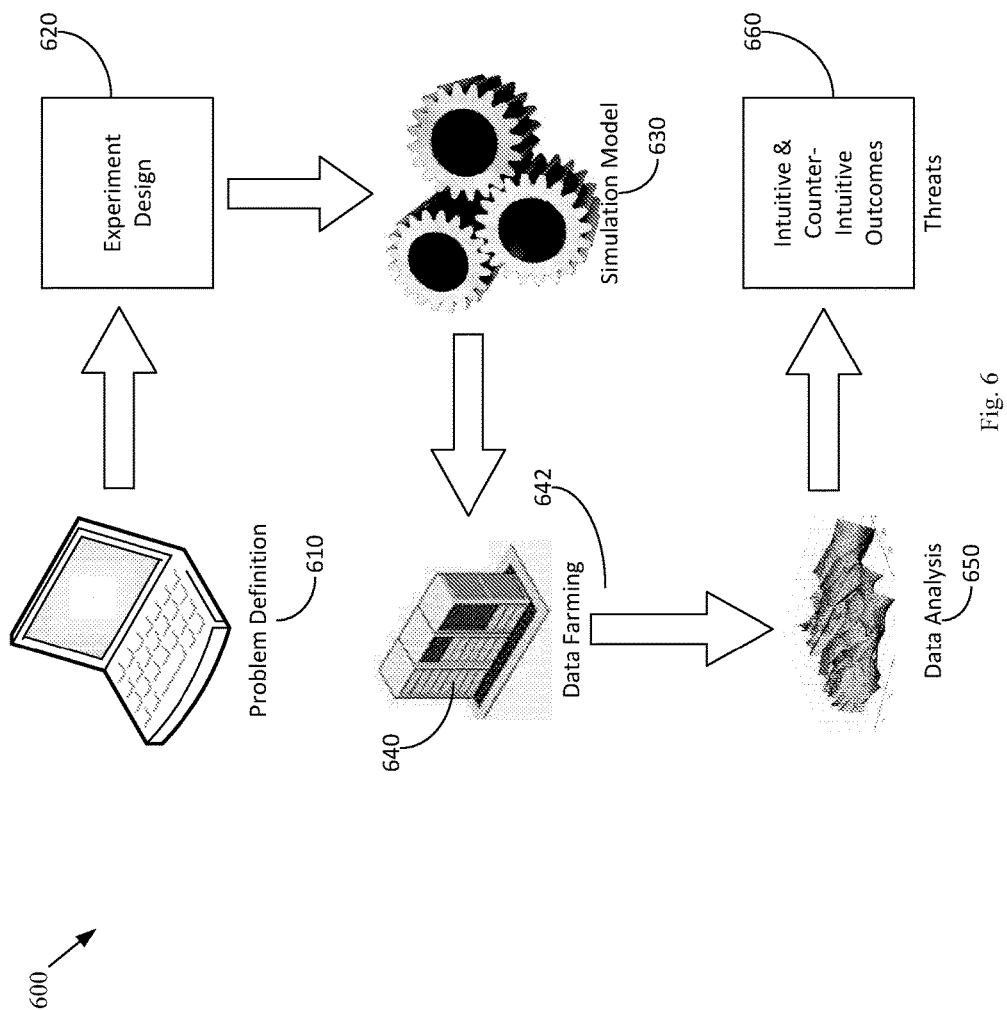
FIG. 6 illustrates a data farming process according to an embodiment.

FIG. 6 illustrates a data farming process 600 according to an embodiment. Data Farming 600 involves generating and assimilating the results of different scenarios for investigation of a wide number of variables across a wide range of values multiple times. The data farming process 6000 starts with defining of a problem 610. An experimental design may be developed 620. A simulation model 630 is created based on the experimental design.

From the simulation 630, data is stored in servers 640, wherein data farming 642 may be performed. During the data farming 642, the user may model combinations and variations within the data space and grow resulting data in an iterative process attempting to answer questions at hand. Data farming 642 is used to perform enough simulations to evaluate the architecture of a small network in a "reasonable time" (e.g., 4 hours). The study time is reduced significantly when input files are not generated. Furthermore, extrapolating the savings to the expected larger studies of more complex systems and scenarios shows the advantages of using data farming 642. Visualization is used to understand the locations of un-patched vulnerabilities and even for basic network understanding. After performing data farming 642, data may then be analyzed 650. Intuitive and counter-intuitive outcomes 660 for threats may be identified from the data analysis.

The data farming process 600 may be performed iterative by modifying any of the processes. Multiple runs of the same scenario are used to determine a statistically significant representation when working with cyber analysis models that have emergent behavior and unpredictable characteristics.

Figure 7:
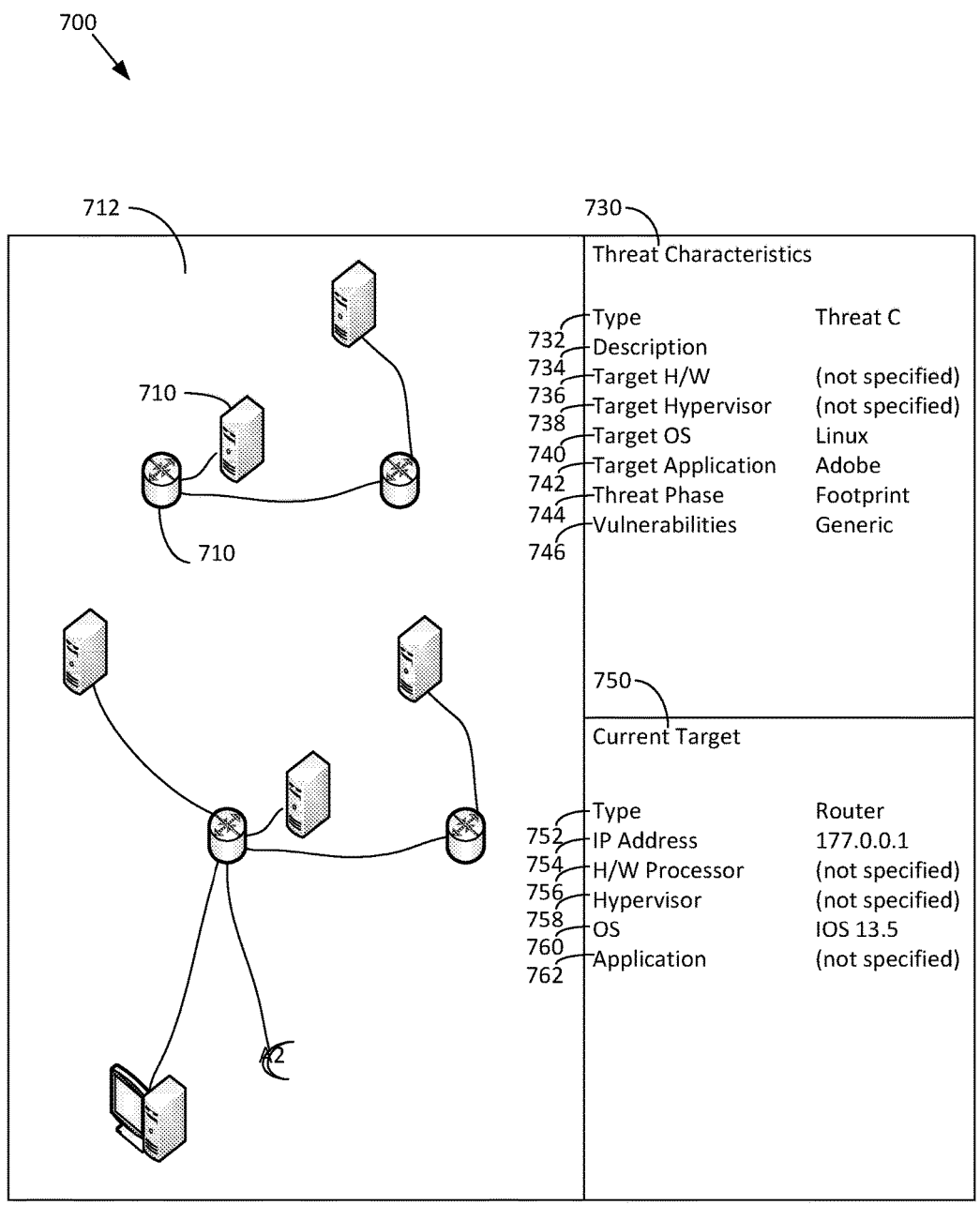
FIG. 7 shows the scenario playback screen and the progress of the attack according to an embodiment.

FIG. 7 shows the scenario playback screen 700 according to an embodiment. Using the NVIS in a monitor commander view mode enables the viewing of a cyber attack's progress through the network by changes in attack phase icons 710 in the displayed network 712 as an attack scenario is played back. Thus, the progression of a cyber attack is visualized as an animation, e.g., dynamic graphics, charts, icons, and other changing features, on a target network depiction. Information regarding the threat characteristics 730 and the current target 750 may be presented proximate to the network visualization 712.

The threat characteristics 730 that may be presented include the type of threat 732, a description 734, the target hardware 736, the target hypervisor 738, the target operating system 740, the target application 742, threat phases 744 and vulnerabilities 746. Information regarding the current target 750 may include the type of target 752, the IP address of the target 754, the hardware processor 756, the hypervisor 758, the operating system 760 and the application 762.

Accordingly, the cyber analysis modeling evaluation for operations (CAMEO) simulation system according to an embodiment may be used to provide cyber resiliency of systems and networks for ensuring mission survivability in a cyber compromised environment. The cyber threat simulation system provides a cyber defense simulation toolkit to evaluate and enhance the resiliency of networks in the face of cyber-attacks. The system provides a scalable, modular, distributed architecture and framework for resilient cyber dynamic defense visualization and simulation to support the selection and configuration of the most effective agile defenses and attack detection mechanisms during planning and operations of tactical mobile networks and other mission networks. Cyber effects modeling converts user defined target functionality/criticality/susceptibility and cyber-attack results into resultant target network operational/nonoperational depiction and metrics. These results directly support operational cost effectiveness analyses for cyber products and system architecture improvements. The modeling of cyber effects enables believable and relevant costing of cyber-attack and defense events/capabilities in operational systems.

The framework of the system abstracts system configurations, network topologies, vulnerabilities, attack methods, and detection methods from the individual simulation engines to provide portability between multiple simulation engines and to ensure compatibility with other cyber analysis tools.

The system may run on a personal computer and may take advantage of compute grids and supercomputers to reduce time to solution and to address analysis with a greater fidelity. A data farming interface automates the processes from the experimental design through the data farming and virtualizes the interface to the high performance computing (HPC) system thus allowing access to COTS HPC clusters and cloud systems.

Figure 8:
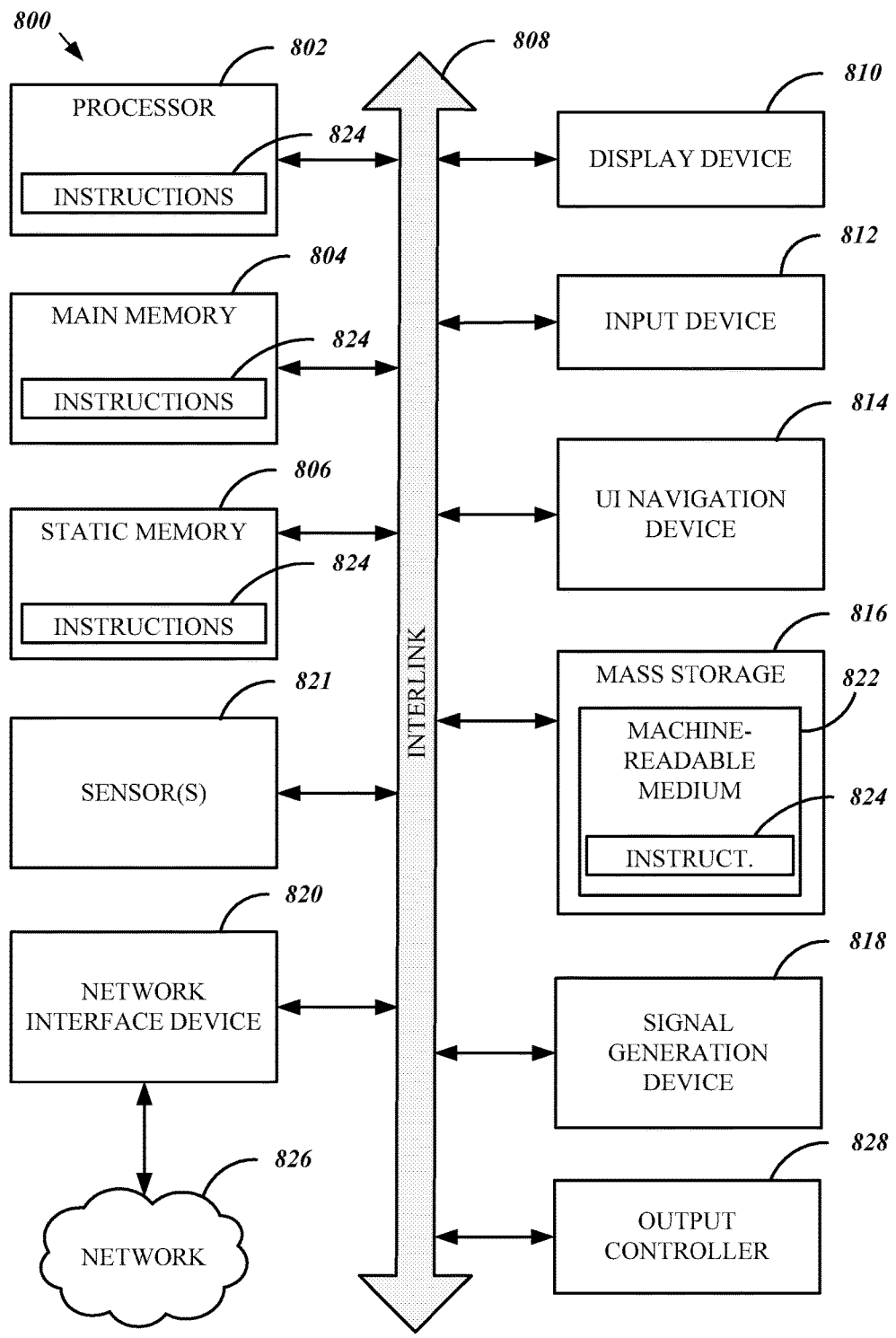
FIG. 8 illustrates a block diagram of an example machine 1300 for providing a cyber analysis modeling evaluation for operations (CAMEO) simulation system according to an embodiment.

FIG. 8 illustrates a block diagram of an example machine 800 for providing a cyber-analysis modeling evaluation for operations (CAMEO) simulation system according to an embodiment upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine and/or a client machine in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 802 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 802 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 800 may include a hardware processor 802 (e.g., a central processing unit (CPU), a graphics processing unit (GPU), a hardware processor core, or any combination thereof), a main memory 804 and a static memory 806, at least some of which may communicate with others via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The storage device 816 may include at least one machine readable medium 822 on which is stored one or more sets of data structures or instructions 824 (e.g., software) embodying or utilized by any one or more of the techniques or functions described herein. The instructions 824 may also reside, at least partially, additional machine readable memories such as main memory 804, static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) that configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing a cyber modeling and simulation framework, comprising:
receiving, at an ingest interface, network and vulnerability data associated with nodes of a targeted network;
presenting, on a network visualization device, the network data and the vulnerability data;
creating a network model based on the network and vulnerability data presented on the network visualization device;
simulating a launching of threat attacks on the targeted network using the created network model, wherein one or more of the threat attacks include an unknown behavior or an unpredictable characteristic, wherein the threat attacks include separate attack phases with associated time frames in which the threat attacks affect the targeted network differently in each of the separate attack phases;
applying, to the simulated launching of threat attacks, modeled defenses against the threat attacks, wherein the modeled defenses includes defenses at first locations of the targeted network for a first simulation and the defenses provided at second locations of the targeted network for a second simulation, the second locations including at least one different location than the first locations;
producing simulation results from the simulating the launching of threat attacks and the applying the modeled defenses;
performing data farming to produce the simulation results using different scenarios to generate a farm of data and wherein data farming includes simulating the launching of same threat attacks on different configurations of the targeted network and wherein data farming includes simulating the launching of different threat attacks on the same configuration of the targeted network, wherein the same threat attacks include the one or more of the threat attacks that include an unknown behavior or an unpredictable characteristic;
analyzing the data produced from performing the data farming to determine a statistically significant representation of the results; and
designing anti-cyber-attack strategies for the targeted network based on the performed the data farming.

2. The method of claim 1, wherein the designing the anti-cyber-attack strategies comprises designing anti-cyber-attack strategies based on identifying a metric inflection point in the farm of data.

3. The method of claim 2, wherein the identifying the metric inflection point in the farm of data comprises visualizing the farm of data using the network visualization device and analyzing the visualized farm of data to detect the metric inflection point.

4. The method of claim 1, further comprising scanning the network using a vulnerability scanner to provide the data associated with the node of the targeted network to the interface for ingest.

5. The method of claim 1, wherein the presenting, on the network visualization device, the network data and the vulnerability data further comprises manipulating and visualizing the targeted network being simulated and conducting operations on a component tree and interconnections associated with the targeted network, and wherein the results include an amount of successful attacks, an amount of partially successful attacks, an amount of attack disruptions by the modeled defenses, and a duration of a successful attack for each network configuration of the different configurations of the targeted network.

6. The method of claim 1, wherein the simulating the launching of threat attacks and the applying the modeled defenses further comprises setting the threat attacks in opposition to the targeted network and selected defenses.

7. The method of claim 1 further comprises storing resultant data from scenario runs created by the simulating the launching of threat attacks and the applying the modeled defenses and accessing the stored resultant data.

8. The method of claim 1, wherein the performing data farming further comprises generating the farm of data based on metrics used to evaluate resiliency techniques and cyber threats.

9. The method of claim 1 further comprises presenting the farm of data for post-processing to narrow an output of the farm of data into a grouping of data of interest based upon resiliency metrics.

10. The method of claim 1, wherein the receiving, at the ingest interface, network and vulnerability data further comprises receiving the network and vulnerability data at a single common interface for disparate authoritative sources of device, application, hardware, vulnerability, and weakness data.

11. A cyber modeling and simulation framework system, comprising:
an interface, provided by one or more hardware processors, for ingest of network and vulnerability data associated with a node of a targeted network;
a network visualization device coupled to the one or more hardware processors, the network visualization device for presenting the network data and the vulnerability data, and for creating a network model based on the network and vulnerability data;
a threat analysis simulator, executable by the one or more hardware processors, for simulating launching threat attacks on the targeted network using the created network model, wherein one or more of the threat attacks include an unknown behavior or an unpredictable characteristic, for applying separate attack phases with associated time frames in which the threat attacks affect the targeted network differently in each of the separate attack phases, and for applying modeled defenses against the threat attacks, wherein the modeled defenses includes defenses at first locations of the targeted network for a first simulation and the defenses provided at second locations of the targeted network for a second simulation, the second locations including at least one different location than the first locations, the threat analysis simulator producing simulation results; and
a data farming module including instructions stored on a memory, the instructions, when executed by the one or more hardware processors cause the one or more hardware processors to perform data farming by causing the threat analysis simulator to produce simulation results using different scenarios to generate a farm of data for use in designing anti-cyber-attack strategies for the targeted network, and wherein data farming includes simulating the launching of same threat attacks on different configurations of the targeted network and wherein data farming includes simulating the launching of different threat attacks on the same configuration of the targeted network, wherein the same threat attacks includes the one or more of the threat attacks that include an unknown behavior or an unpredictable characteristic;
wherein the threat analysis simulator is further for analyzing the data produced from performing the data farming to determine a statistically significant representation of the results and designing anti-cyber-attack strategies for the targeted network based on the simulation results.

12. The cyber modeling and simulation framework of claim 11, wherein the anti-cyber-attack strategies are based on an identification of a metric inflection point in the farm of data.

13. The cyber modeling and simulation framework of claim 12, wherein the identification of the metric inflection point in the farm of data is based on visualization of the farm of data using the network visualization device.

14. The cyber modeling and simulation framework of claim 11 further comprising a vulnerability scanner for providing the data associated with the node of the targeted network to the interface for ingest.

15. The cyber modeling and simulation framework of claim 11, wherein the network visualization device is arranged to manipulate and visualize the targeted network being simulated and to conduct operations on a component tree and interconnections associated with the targeted network.

16. The cyber modeling and simulation framework of claim 11, wherein the threat analysis simulator sets the threat attacks in opposition to the targeted network and selected defenses.

17. The cyber modeling and simulation framework of claim 11 further comprises a data warehouse arranged to store resultant data from scenario runs executed by the threat analysis simulator, the resultant data accessible for analysis.

18. The cyber modeling and simulation framework of claim 11, wherein the farm of data is generated by the data farming module based on metrics used to evaluate resiliency techniques and cyber threats.

* * * * *